(12) United States Patent
Kamikawa et al.

(10) Patent No.: US 7,135,994 B2
(45) Date of Patent: Nov. 14, 2006

(54) IMAGE DISPLAY APPARATUS

(75) Inventors: Noriyuki Kamikawa, Hyogo (JP);
Takashi Ota, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 479 days.

(21) Appl. No.: 10/464,791

(22) Filed: Jun. 19, 2003

(65) Prior Publication Data
US 2003/0236618 A1    Dec. 25, 2003

(30) Foreign Application Priority Data
Jun. 24, 2002    (JP)    ............................. 2002-182480

(51) Int. Cl.
*G08G 1/123* (2006.01)
(52) U.S. Cl. .................. 340/995.14; 701/208
(58) Field of Classification Search ...................... None
See application file for complete search history.

(56) References Cited

U.S. PATENT DOCUMENTS

| | | | | |
|---|---|---|---|---|
| 4,661,811 A | * | 4/1987 | Gray et al. ................. | 345/636 |
| 4,943,925 A | * | 7/1990 | Moroto et al. .............. | 701/211 |
| 5,396,431 A | * | 3/1995 | Shimizu et al. ............. | 701/213 |
| 5,519,609 A | * | 5/1996 | Kuchenrither et al. ......... | 702/5 |
| 5,884,218 A | * | 3/1999 | Nimura et al. .............. | 701/208 |
| 5,917,436 A | * | 6/1999 | Endo et al. ............ | 340/995.14 |
| 6,006,161 A | * | 12/1999 | Katou ........................ | 701/212 |
| 6,128,571 A | * | 10/2000 | Ito et al. ...................... | 701/201 |
| 6,182,010 B1 | * | 1/2001 | Berstis ....................... | 701/211 |
| 6,462,674 B1 | * | 10/2002 | Ohmura et al. ............. | 340/901 |
| 6,725,154 B1 | * | 4/2004 | Kamikawa et al. ......... | 701/208 |
| 6,950,743 B1 | * | 9/2005 | Kainuma et al. ........... | 701/208 |

FOREIGN PATENT DOCUMENTS

| | | | |
|---|---|---|---|
| JP | A 1-163608 | | 6/1989 |
| JP | A 5-113343 | | 5/1993 |
| JP | 405165402 A | * | 7/1993 |
| JP | 2554112 B2 | | 8/1996 |
| JP | 2000-003497 A | | 1/2000 |
| KR | A 2000-0013568 | | 6/2000 |
| KR | A 2001-0105634 | | 11/2001 |

* cited by examiner

Primary Examiner—Benjamin C. Lee
(74) Attorney, Agent, or Firm—Oliff & Berridge, PLC

(57) ABSTRACT

An in image display apparatus having a first display control unit for displaying a map image on a display panel on the basis of map data, a second display control unit for displaying real images of facilities such as ballparks, which images have the same scale of that of the map image, in areas corresponding to the facilities such as ballparks on the map image on the basis of area information indicating the areas corresponding to the facilities such as ballparks on the map image, and real image data associated with position coordinates.

8 Claims, 14 Drawing Sheets

FIG. 3

| | CATEGORY | LOCATION COORDINATES | AREA INFORMATION |
|---|---|---|---|
| FACILITY A | SCHOOL | $(x_{10}, y_{10})$ | $(x_{11}, y_{11}), (x_{12}, y_{12}), (x_{13}, y_{13}),$ $(x_{14}, y_{14})$ |
| FACILITY B | CONVENIENCE STORE | $(x_{20}, y_{20})$ | $(x_{21}, y_{21}), (x_{22}, y_{22}), (x_{23}, y_{23}),$ $(x_{24}, y_{24}), (x_{25}, y_{25})$ |
| FACILITY C | BANK | $(x_{30}, y_{30})$ | $(x_{31}, y_{31}), (x_{32}, y_{32}), (x_{33}, y_{33}),$ $(x_{34}, y_{34})$ |
| FACILITY D | PARK | $(x_{40}, y_{40})$ | |

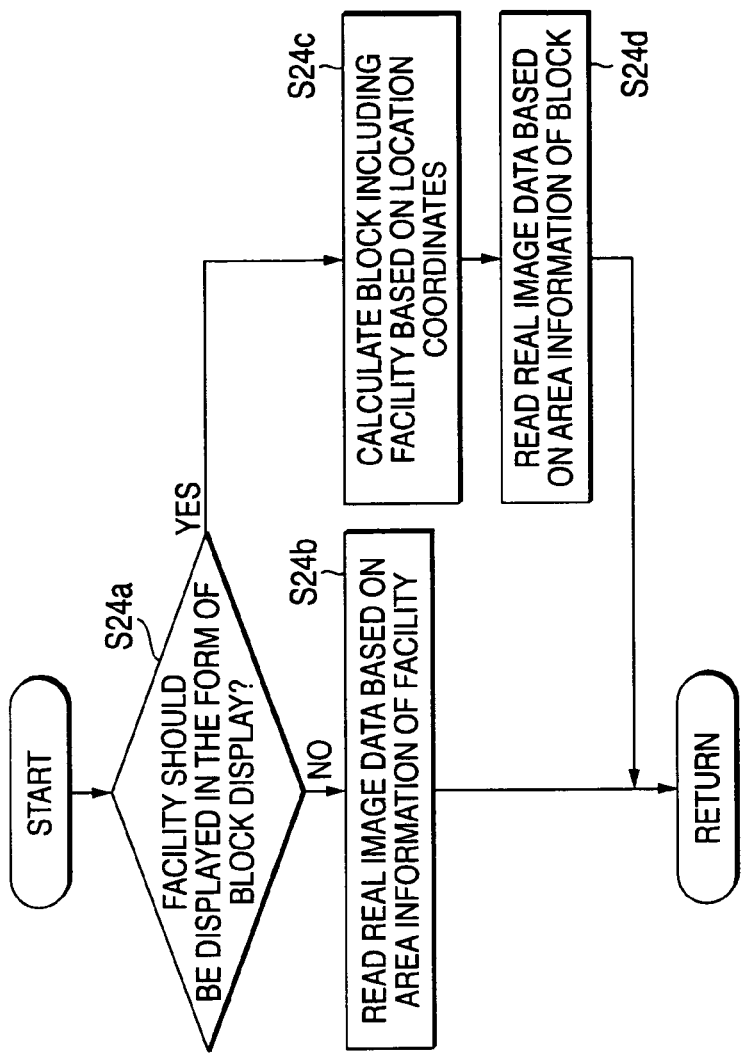
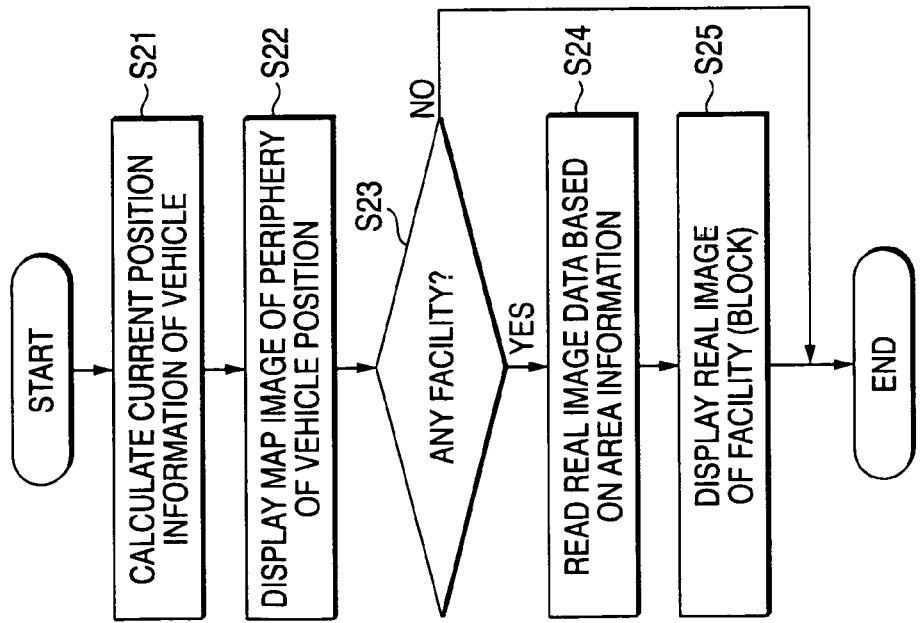
FIG. 9A
FIG. 9B

IMAGE DISPLAY APPARATUS

The present disclosure relates to the subject matter contained in Japanese Patent Application No. 2002-182480 filed on Jun. 24, 2002, which is incorporated herein by reference in its entirety.

BACKGROUND OF THE INVENTION

1. Field of the Invention

The present invention relates to image display apparatus, and particularly relates to image display apparatus adopted in a navigation system and using real image data corresponding to a real image such as a satellite photograph or an aerial photograph of an earth's surface.

2. Description of the Related Art

A navigation system in the related art can display a map on a screen of a display unit on the basis of road map data stored in a DVD-ROM or the like, and further can display the position of the navigation system itself on the map or guide itself along a route to a destination on the basis of position data of the navigation system itself.

In the navigation system in the related art, however, a map image to be displayed is produced out of map data. Therefore, there is a problem that it is difficult to seize the current position of the navigation system itself through the map image or grasp the real circumstances around the current position of the navigation system itself.

This is because it is difficult to express the vertical position relation ship between roads over head crossing with each other on the map image, and in fact there are many roads and buildings not displayed on the map image.

As one of solutions to such a problem, there has been disclosed an invention in which the current position of the apparatus itself is displayed on an aerial photograph image made up from aerial photograph data (JP-A-5-113343). With such an aerial photograph image, it becomes very easy to see a building or the like as a landmark. Thus, it also becomes easy to seize the current position of the apparatus itself. In addition, there is an advantage that it can be also made easy to grasp the real circumstances around the current position of the apparatus itself.

However, in any case, it is not easier to seize the current position of the apparatus itself by an aerial photograph image made up using aerial photograph data than by a map image made up using map data. In addition, it is not easier to grasp the circumstances around the current position of the apparatus itself by the aerial photograph image than by the map image. It may be still easier to seize the current position of the apparatus itself by the map image than by the aerial photograph image.

Accordingly, it is anticipated that there will prevail next-generation navigation systems not using only aerial photograph images or only map images in the related art but using both the aerial photograph images and the map images. To this end, it is anticipated that it will be important in the future to appropriately use a real image such as an aerial photograph image and a map image having two different characteristics from each other.

SUMMARY OF THE INVENTION

The present invention was developed in consideration of the problem. It is an object of the invention to provide image display apparatus particularly adopted in a navigation system and using appropriately both the display of a real image such as an aerial photograph image and the display of a map image made up using map data, so that the satisfaction level of a user can be enhanced.

In order to achieve the object, according to a first aspect of the invention, an image display apparatus includes a first display control unit and a second display control unit. The first display control unit displays a map image on a display screen on the basis of map data. The second display control unit displays a real image showing a predetermined place on the basis of first area information indicating an area corresponding to the predetermined place on the map image and real image data associated with position coordinates. The real image has the same scale as that of the map image.

In the first aspect, the real image (for example, a satellite photograph or an aerial photograph) of the predetermined place (for example, the place where there is a gas station, a school or a park) taken on the same scale as that of the map image displayed on the display screen is displayed in an area of the map image corresponding to the predetermined place (see FIG. 6).

For example, in the image display apparatus in the related art, a distinctive mark of a gas station, a school, or the like, that is, a so-called landmark is displayed on a map image displayed on a display screen in order to make it easy to grasp the circumstances of the map image. In the image display apparatus of the first aspect, however, a real image of a facility such as a gas station or a school taken on the same scale of that of the map image is displayed. Accordingly, the place is displayed on the map image not only in the form of a real image but also with the same size (lot area) as the map image. Thus, it can be made very easy to grasp the circumstances indicated by the map image.

Further, according to a second aspect of the invention, an image display apparatus includes a first display control unit, a block calculating unit, and a third display control unit. The first display control unit displays a map image on a display screen on the basis of map data. The block calculating unit obtains a block including a predetermined place on the basis of location information indicating a location of the predetermined place. The third display control unit displays a real image showing the block calculated by the block calculating unit on the basis of second area information indicating an area corresponding to the block on the map image and real image data associated with position coordinates. The real image has the same scale as that of the map image.

In the second aspect, the real image (for example, a satellite photograph or an aerial photograph) of a block (for example, a region where a park or the like is partitioned by comparatively wide roads such as arterial roads) including the predetermined place (for example, the place where there is a gas station, a school, or a park) taken on the same scale as that of the map image displayed on the display screen is displayed in an area corresponding to the block on the map image (see FIG. 8).

Accordingly, the place is displayed on the map image not only in the form of a real image but also with the same size (lot area) as the map image. Thus, it can be made very easy to grasp the circumstances indicated by the map image. In addition, not only the place but also the block including the place are displayed in the form of the real image. Accordingly, not only the place but also the real circumstances around the place can be brought to the user's knowledge.

In addition, when a real image cutting out the predetermined place is displayed on the map image as shown in FIG. 6 which will be described later, area information (that is, two-dimensional information) showing an area (that is, a plane) of a facility such as a school or the like is required as information about the facility. On the other hand, when a real image of a block including the predetermined place is displayed, it may go well if location information indicating the location (that is, a point) of a facility such as a school or the like is provided. Accordingly, in the image display apparatus of the second aspect, there is an advantage that it will go well if not high-level area information but the comparatively low-level location information is prepared.

Further, according to a third aspect of the invention, the image display apparatus of the first aspect further includes a block calculating unit, a third display control unit, and a changeover control unit. The block calculating unit obtains a block including the predetermined place on the basis of location information indicating a location of the predetermined place. The third display control unit displays another real image showing the block calculated by the block calculating unit on the basis of second area information indicating another area corresponding to the block on the map image and real image data associated with position coordinates. The another real image has the same scale as that of the map image. The changeover control unit changes control between the second display control unit and the third display control unit on the basis of a predetermined condition.

In the third aspect, there are provided a function in which the real image of the predetermined place taken on the same scale as that of the map image displayed on the display screen is displayed in an area corresponding to the predetermined place on the map image, and a function in which the real image of the block including the predetermined place and taken on the same scale as that of the map image is displayed in an area corresponding to the predetermined block on the map image. Further, these functions are used appropriately in accordance with the predetermined conditions. Accordingly, the display of the real image is used appropriately in accordance with the conditions so that a more significant display form can be attained (see FIG. 10).

Incidentally, the predetermined conditions may include the category of application of the place (for example, the category of the facility). For example, in the case of a place such as a park having a vague and indistinct boundary, a real image in which not only the park itself but also a wide region (block) including the park have been taken is displayed on the map image.

Further, according to a fourth aspect of the invention, the image display apparatus of any one of the first to third aspects further includes a place setting unit for allowing a user to set a specific place. The predetermined place is the specific place set by the place setting unit.

In the fourth aspect, the place setting unit is provided so that the user can set the specific place desirably, and further a real image of the place set by the user can be displayed on the map image. Accordingly, it is possible to attain a display form meeting the user's desire.

Further, according to a fifth aspect of the invention, the image display apparatus of any one of the first to third aspects further includes a category setting unit for allowing a user to set a specific category. The predetermined place is included in the specific category set by the category setting unit.

In the fifth aspect, the category setting unit is provided so that the user can set the category of the place (for example, the category of the facility) desirably, and further a real image of the place included in the category set by the user can be displayed on the map image. Accordingly, it is possible to attain a display form meeting the user's desire.

Further, according to a sixth aspect of the invention, a navigation apparatus provides a user with information required reaching a destination and guides a vehicle to the destination. The navigation apparatus includes a display screen, a first display control unit, a second display control unit, a storage unit, and a place calculating unit. The first display control unit displays a map image on the display screen on the basis of map data. The second display control unit displays a real image showing a predetermined place on the basis of first area information indicating an area corresponding to the predetermined place on the map image and real image data associated with position coordinates. The real image has the same scale as that of the map image. The storage unit stores information about a running history of the vehicle. The place calculating unit obtains a specific place on the basis of the running history stored in the storage unit. The predetermined place is the specific place obtained by the place calculating unit.

In the sixth aspect, a real image of a specific place (for example, a place where there is a facility having been visited before) obtained on the basis of the running history can be displayed on the map image. Accordingly, any place related to the history of the user can be displayed as a real image. Thus, the history can be confirmed through the contents displayed on the display screen.

Further, according to a seventh aspect of the invention, an image display apparatus includes a first display control unit and a fourth display control unit. The first display control unit displays a map image on a display screen on the basis of map data. The fourth display control unit displays a real image showing a predetermined block on the basis of second area information indicating an area corresponding to the predetermined block on the map image and real image data associated with position coordinates. The real image has the same scale as that of the map image.

In the seventh aspect, the real image of the predetermined block (for example, a region where a park or the like is partitioned by comparatively wide roads such as arterial roads) taken on the same scale of that of the map image displayed on the display screen is displayed in an area corresponding to the predetermined block on the map image (see FIG. 14).

That is, the real image is displayed as if it is fitted into the area corresponding to the predetermined block. Thus, it is possible to make it very easy to grasp the circumstances shown by the map image.

Further, according to an eighth aspect of the invention, a navigation apparatus provides a user with information required reaching a destination and guides a vehicle to the destination. The navigation apparatus includes a display screen, a first display control unit, a fourth display control unit, a storage unit, and a block calculating unit. The first display control unit displays a map image on the display screen on the basis of map data. The fourth display control unit displays a real image showing a predetermined block on the basis of second area information indicating an area corresponding to the predetermined block on the map image and real image data associated with position coordinates. The real image has the same scale as that of the map image. The storage unit stores information about a running history of the vehicle. The block calculating unit obtains a specific block on the basis of the running history stored in the storage unit. The predetermined block is the specific block obtained by the block calculating unit.

In the eighth aspect, a real image of a specific block (for example, a block including a place where there is a facility having been visited before) obtained on the basis of the running history can be displayed on the map image. Accordingly, any block related to the history of the user can be displayed as a real image. Thus, the history can be confirmed through the contents displayed on the display screen.

Further, according to a ninth aspect of the invention, an image display apparatus includes a fifth display control unit. The fifth display control unit displays a real image on a display screen on the basis of real image data associated with position coordinates. The fifth display control unit displays the real image with differentiating a predetermined block from a portion of the real image other than the predetermined block on the basis of area information indicating an area corresponding to the predetermined block, and the real image data.

In the ninth aspect, when the real image is displayed on the display screen, the real image is display so that the predetermined block (for example, a block that the user has visited before) is differentiated from any other portion (for example, a block that the user has never visited before) (see FIG. 16).

Accordingly, the user can grasp a more remarkable block or the like instantaneously. Thus, a very significant apparatus can be attained. Incidentally, a method for displaying the block and any other portion with differentiating the block from the other portion includes a method of displaying the block in color while displaying the other portion in monochrome.

Further, according to a tenth aspect of the invention, the image display apparatus of the ninth aspect further includes a block setting unit for allowing a user to set a specific block. The predetermined block is the specific block set by the block setting unit.

In the tenth aspect, the block setting unit is provided so that the user can set the specific block desirably, and further display can be carried out while the block set by the user is differentiated from any other portion. It is therefore possible to attain a display form meeting the user's desire.

Further, according to an eleventh aspect of the invention, a navigation apparatus provides a user with information required reaching a destination and guides a vehicle to the destination. The navigation apparatus includes a display screen, a fifth display control unit, a storage unit, and a block calculating unit. The fifth display control unit displays a real image on a display screen on the basis of real image data associated with position coordinates. The fifth display control unit differentiates the real image displayed in a predetermined block from the real image displayed in a portion other than the predetermined block on the basis of area information indicating an area corresponding to the predetermined block, and the real image data. The storage unit stores information about a running history of the vehicle. The block calculating unit obtains a specific block on the basis of the running history stored in the storage unit. The predetermined block is the specific block obtained by the block calculating unit.

In the eleventh aspect, display can be carried out while a specific block (for example, a block including a place where there is a facility having been visited before) obtained on the basis of the running history is differentiated from any other portion. Thus, the user can instantaneously grasp which area the user has visited before through the contents displayed on the display screen.

BRIEF DESCRIPTION OF THE DRAWINGS

FIG. 3 is a table showing an example of the configuration of facility data stored in a DVD-ROM in the navigation system in which the image display apparatus according to Embodiment (1) has been adopted.

FIGS. 9A and 9B are flow charts showing a processing operation to be executed by a microcomputer in a navigation system in which image display apparatus according to Embodiment (3) has been adopted.

DETAILED DESCRIPTION OF THE PREFERRED EMBODIMENTS

Figure 1:
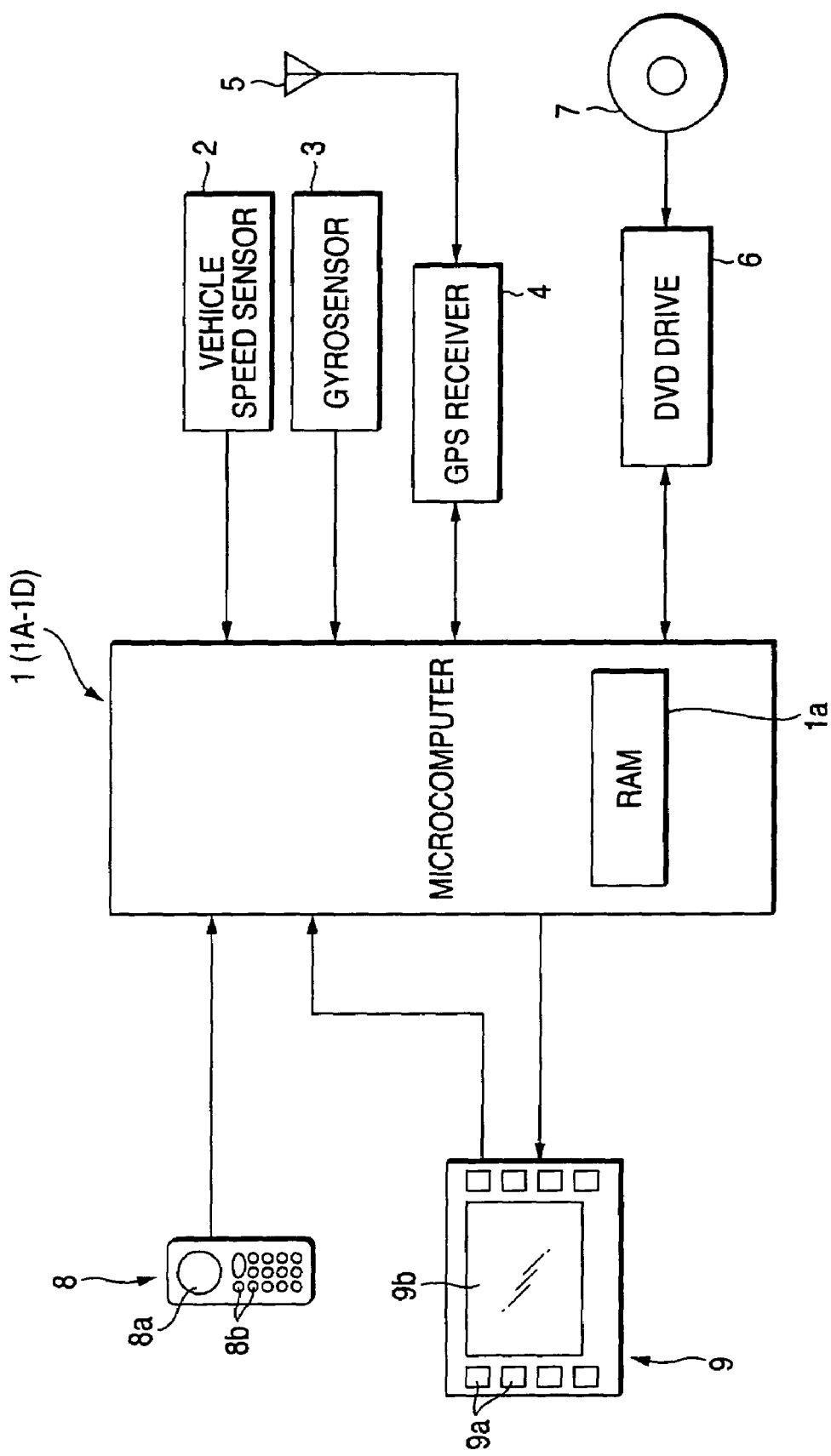
FIG. 1 is a block diagram schematically showing a main portion of a navigation system in which image display apparatus according to Embodiment (1) of the invention has been adopted.

Embodiments of image display apparatus according to the invention will be described below with reference to the drawings. FIG. 1 is a block diagram schematically showing the main portion of a navigation system in which image display apparatus according to Embodiment (1) has been adopted.

A vehicle speed sensor 2 for acquiring information about the mileage from the vehicle speed by arithmetic operation and a gyro sensor 3 for acquiring information about the traveling direction are connected to a microcomputer 1. The microcomputer 1 can obtain the position of the vehicle on the basis of the mileage information and the traveling direction information obtained thus (self-contained navigation).

A GPS receiver 4 receives a GPS signal from a satellite through an antenna 5. The GPS receiver 4 is connected to the microcomputer 1 so that the microcomputer 1 can obtain the position of the vehicle on the basis of the GPS signal (GPS navigation).

In addition, a DVD drive 6 is connected to the microcomputer 1 so that map data, real image data or the like can be imported from a DVD-ROM 7 (possibly from another storage unit) in which the map data and the real image data are recorded. The real image data includes satellite photographs of the surface of the earth taken on the same scale as that of the map data. The microcomputer 1 stores required pieces of the map data (particularly road data, facility data, or the like, which will be described later) and the real image data from the DVD-ROM 7 into a RAM 1a in the microcomputer 1 on the basis of the obtained current position information of the vehicle, the route information about a navigation route which will be described later, and so on. Incidentally, as the method for associating the real image data with position coordinates, for example, the left upper and right lower latitudes and longitudes of a rectangular area expressed by the real image data may be used.

In addition, the map data includes road data, facility data, etc. Further, the road data includes node data and link data. The node data includes coordinates, a node ID and connection information of each node as accessory data, and the link data includes node IDs at opposite ends, a road shape (coordinates of interpolated points), a road category and width of each link as accessory data.

Figure 2:
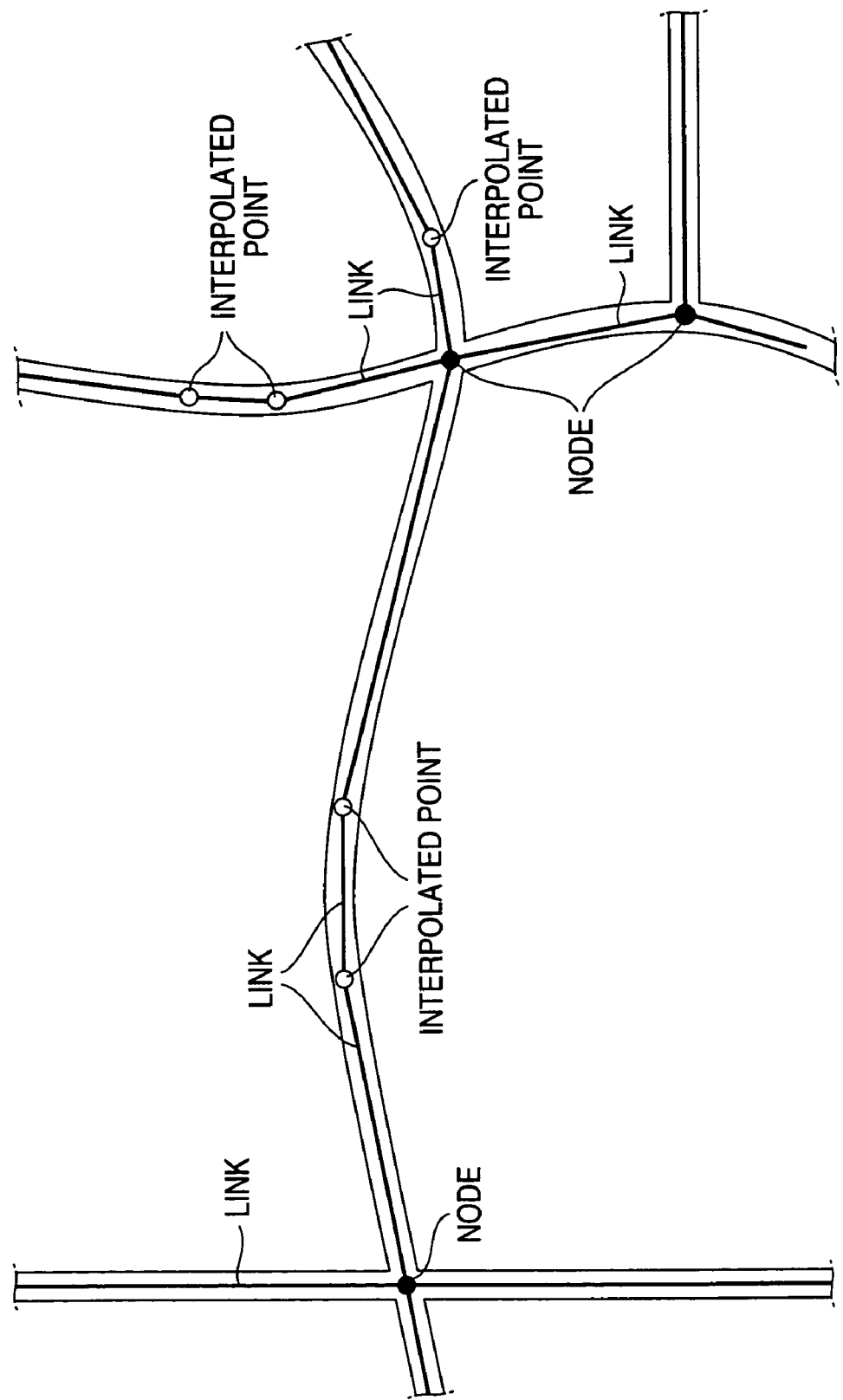
FIG. 2 is an explanatory view for explaining the relationship among nodes, links and interpolated points.

FIG. 2 is an explanatory view for explaining the relationship among nodes, links and interpolated points. As shown in FIG. 2, each node is an intersection where roads cross each other, each link is a line segment connecting a node or an interpolated point with another node or another interpolated point, and each interpolated point is a point for expressing the shape of the link.

On the other hand, the facility data includes a category (for example, school, convenience store, bank, or park) of each facility, location coordinates indicating the location of the facility, area information indicating the area of the facility, and so on, as shown in FIG. 3.

Figure 4:
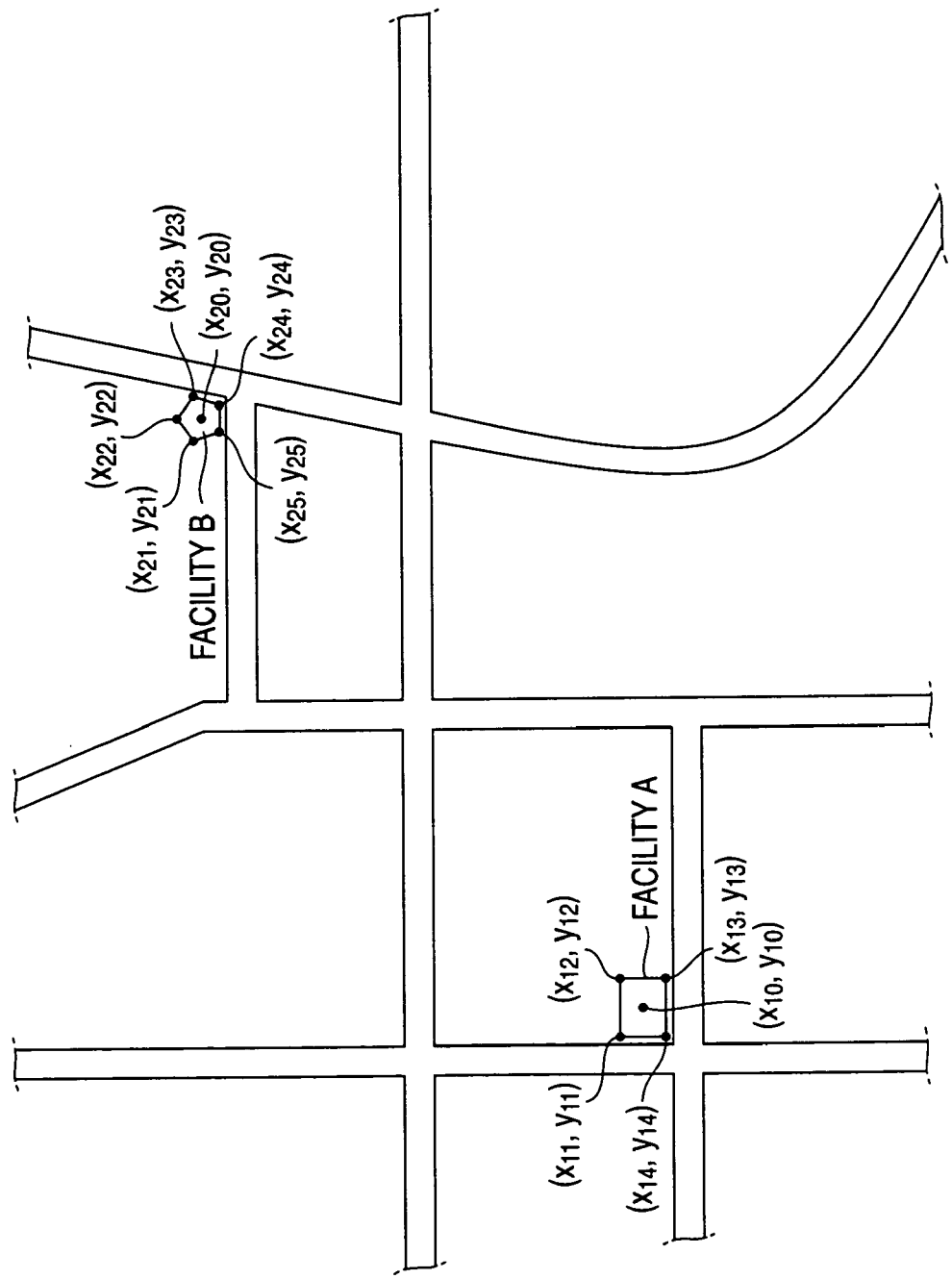
FIG. 4 is an explanatory view for explaining location coordinates of facilities, and area information.

FIG. 4 is an explanatory view for explaining the location coordinates and the area information, and showing that the area information of a facility A is constituted by four points of coordinates $(x_{11}, y_{11})$ to $(x_{14}, Y_{14})$, and the area information of a facility B is constituted by five points of coordinates $(X_{21}, Y_{21})$ to $(X_{25}, y_{25})$. In addition, FIG. 4 shows that the location coordinates of the facility A are $(x_{10}, y_{10})$, and the location coordinates of the facility B are $(x_{20}, y_{20})$.

In addition, the microcomputer 1 performs map matching processing for matching the obtained current position of the vehicle with the map data (real image data) so that a map image (real image) showing the current position of the vehicle accurately can be displayed on a display panel 9b.

In addition, a switch signal output from a joystick 8a or a button switch 8b provided in a remote controller 8, or a switch signal output from a button switch 9a provided in a display unit 9 is supplied to the microcomputer 1. The microcomputer 1 performs processing in accordance with such a switch signal. For example, when the microcomputer 1 acquires information of a destination or a way point from one of these switches, the microcomputer 1 obtains an optimal route from the current position (place of departure) of the vehicle to the destination via the way point, and displays the optimal route as a navigation route on the display panel 9b together with the map image.

In addition, a plurality of infrared LEDs and a plurality of phototransistors are disposed in the upper, lower, left and right of the display panel 9b so as to be opposed to each other, so that the position where a finger touches the display panel 9b can be detected. The detection result can be acquired by the microcomputer 1.

Figure 5:
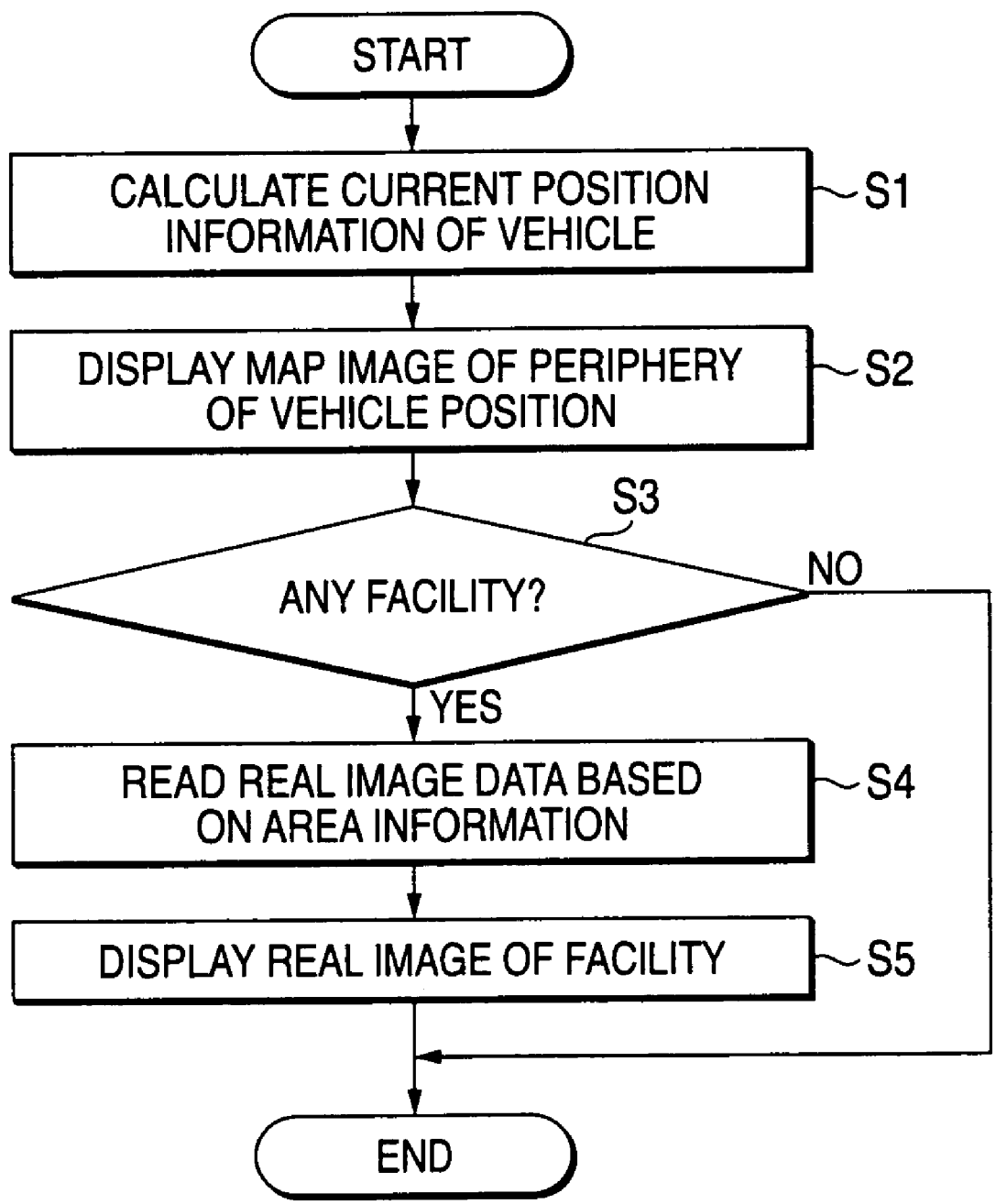
FIG. 5 is a flow chart showing a processing operation to be executed by a microcomputer in the navigation system in which the image display apparatus according to Embodiment (1) has been adopted.

Next, a processing operation (1), which the microcomputer 1 performs in the navigation system in which the image display apparatus according to Embodiment (1) has been adopted, will be described with reference to a flow chart shown in FIG. 5. First, the current position of the vehicle is calculated from the GPS signal or the like (Step S1). A map image showing the periphery of the current position of the vehicle is displayed on the display panel 9b on the basis of the calculated current position information of the vehicle and the map data (particularly the road data) (Step S2).

Succeedingly, it is judged whether there is a facility registered in the facility data on the map image displayed on the display panel 9b or not (Step S3). When it is concluded that there is a corresponding facility, that is, there is a facility (for example, a school $P_1$, a park $P_2$ or a ballpark $P_3$ shown in FIG. 6 which will be described later) to be displayed on the map image, real image data corresponding to a real image of the corresponding facility is read from the RAM 1a on the basis of the area information indicating the area corresponding to the facility (Step S4). The real image corresponding to the read real image data is displayed in the area where the real image should be displayed (that is, the area indicated by the area information) on the map image (Step S5). On the other hand, when it is concluded in Step S3 that there is no corresponding facility, the processing operation (1) is terminated as it is.

Figure 6:
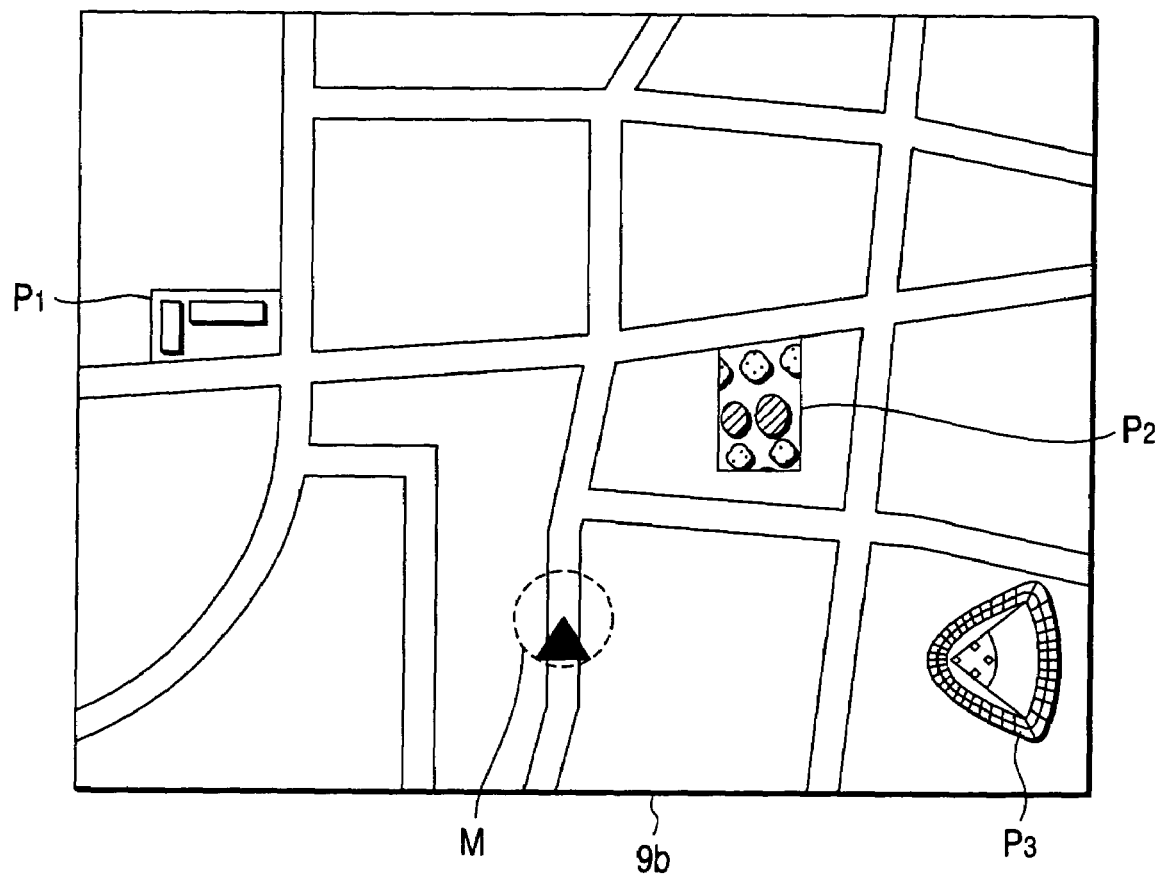
FIG. 6 is a view showing an example of the state of a screen displayed on a display panel in the navigation system in which the image display apparatus according to Embodiment (1) has been adopted.

FIG. 6 is a view showing a state where real images of facilities such as a school and so on are displayed on the map image displayed on the display panel 9b. In FIG. 6, a reference sign M designates a position mark of the vehicle, and reference signs $P_1$ to $P_3$ designate real images of a school, a park and a ballpark, respectively.

In the navigation system in which the image display apparatus according to Embodiment (1) has been adopted, the real images of facilities (for example, facilities such as schools, parks, and ballparks) taken on the same scale as that of the map image displayed on the display panel 9b are displayed in areas of the map image corresponding to the facilities, respectively.

Accordingly, as a matter of course, each facility is displayed on the map image in the form of a real image. In addition, the map image and the real image are display so that a ratio of an actual size (lot area) of each facility to an actual region corresponding to a region of the map image displayed on the display panel 9b is equal to a ratio of a size (lot area) of each facility displayed in the form of the real image on the display panel 9b to a region displayed on the display panel 9b. Thus, it is possible to make it very easy to grasp the circumstances shown by the map image.

Next, description will be made on a navigation system in which image display apparatus according to Embodiment (2) has been adopted. Incidentally, the navigation system has a configuration similar to that of the navigation system shown in FIG. 1, except the microcomputer 1. Therefore, the microcomputer is denoted by another reference numeral, and description of the other parts will be omitted here.

Figure 7:
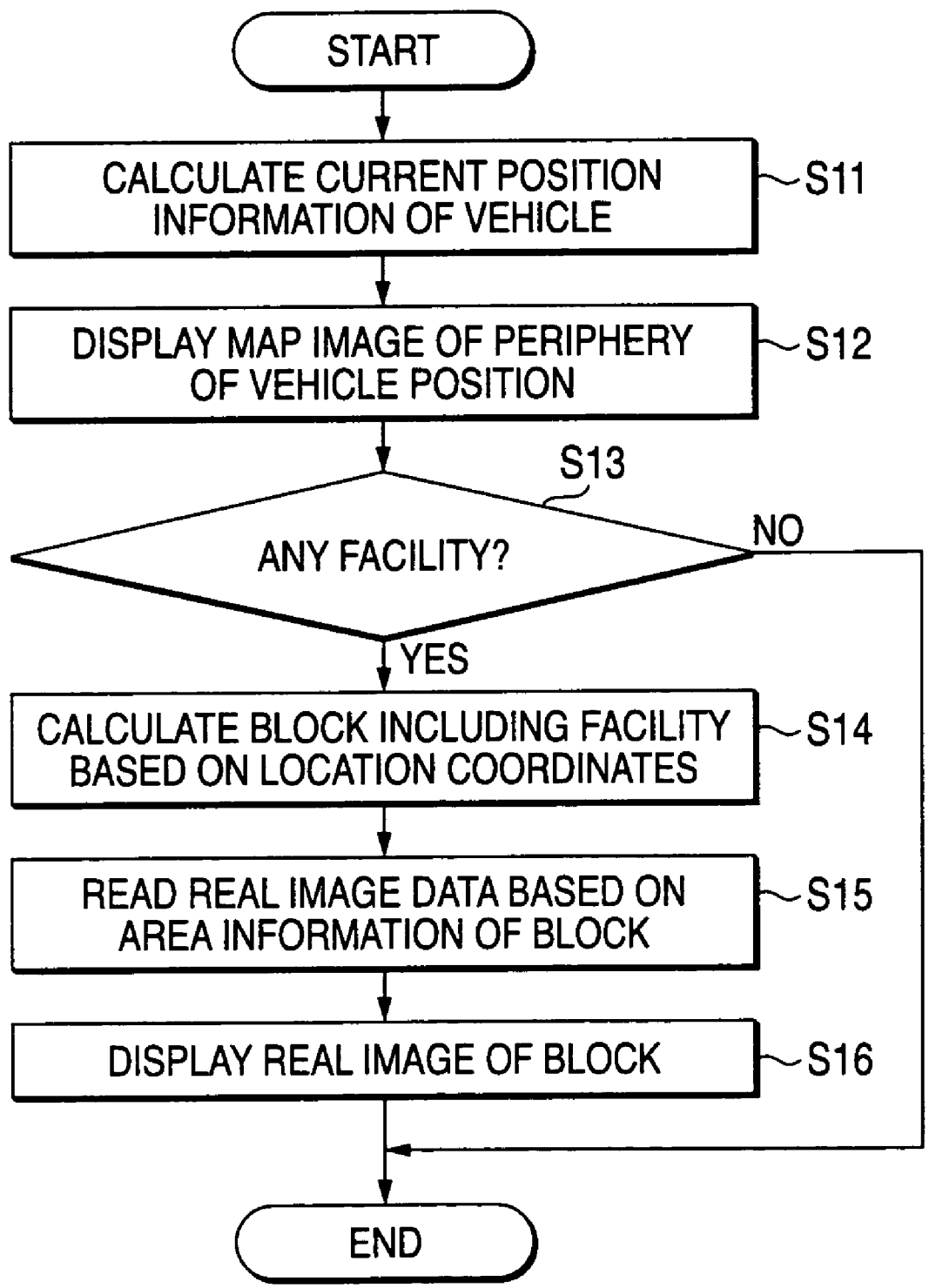
FIG. 7 is a flow chart showing a processing operation to be executed by a microcomputer in a navigation system in which image display apparatus according to Embodiment (2) has been adopted.

A processing operation (2), which the microcomputer 1A performs in the navigation system in which the image display apparatus according to Embodiment (2) has been adopted, will be described with reference to the flow chart shown in FIG. 7. First, the current position of the vehicle is calculated from the GPS signal or the like (Step S11). A map image showing the periphery of the current position of the vehicle is displayed on the display panel 9b on the basis of the calculated current position information of the vehicle, and the map data (particularly the road data) (Step S12).

Succeedingly, it is judged whether there is a facility registered in the facility data on the map image displayed on the display panel 9b or not (Step S13). When it is concluded that there is a corresponding facility, that is, there is a facility (for example, a school $P_1$, a park $P_2$ or a ballpark $P_3$ shown in FIG. 8 which will be described later) to be displayed on the map image, a block (each of blocks $E_1$ to $E_3$ shown in FIG. 8, which is a region partitioned by comparatively wide roads such as arterial roads) including the corresponding facility is obtained on the basis of the location coordinates indicating the location of the facility, and the road data (Step S14). Incidentally, a method for obtaining the block includes, for example, a method of picking up coordinates of nodes and coordinates of interpolated points indicating the region, which is partitioned by the comparatively wide roads.

Next, real image data corresponding to a real image of the block including the facility is read from the RAM 1a on the basis of the area information (for example, the coordinates of nodes and the coordinates of interpolated points indicating the region) of the block (Step S15). The real image corresponding to the read real image data is displayed in the area where the real image should be displayed, (that is, the area indicated by the area information) on the map image (Step S16). On the other hand, when it is concluded in Step S13 that there is no corresponding facility, the processing operation (2) is terminated as it is.

Figure 8:
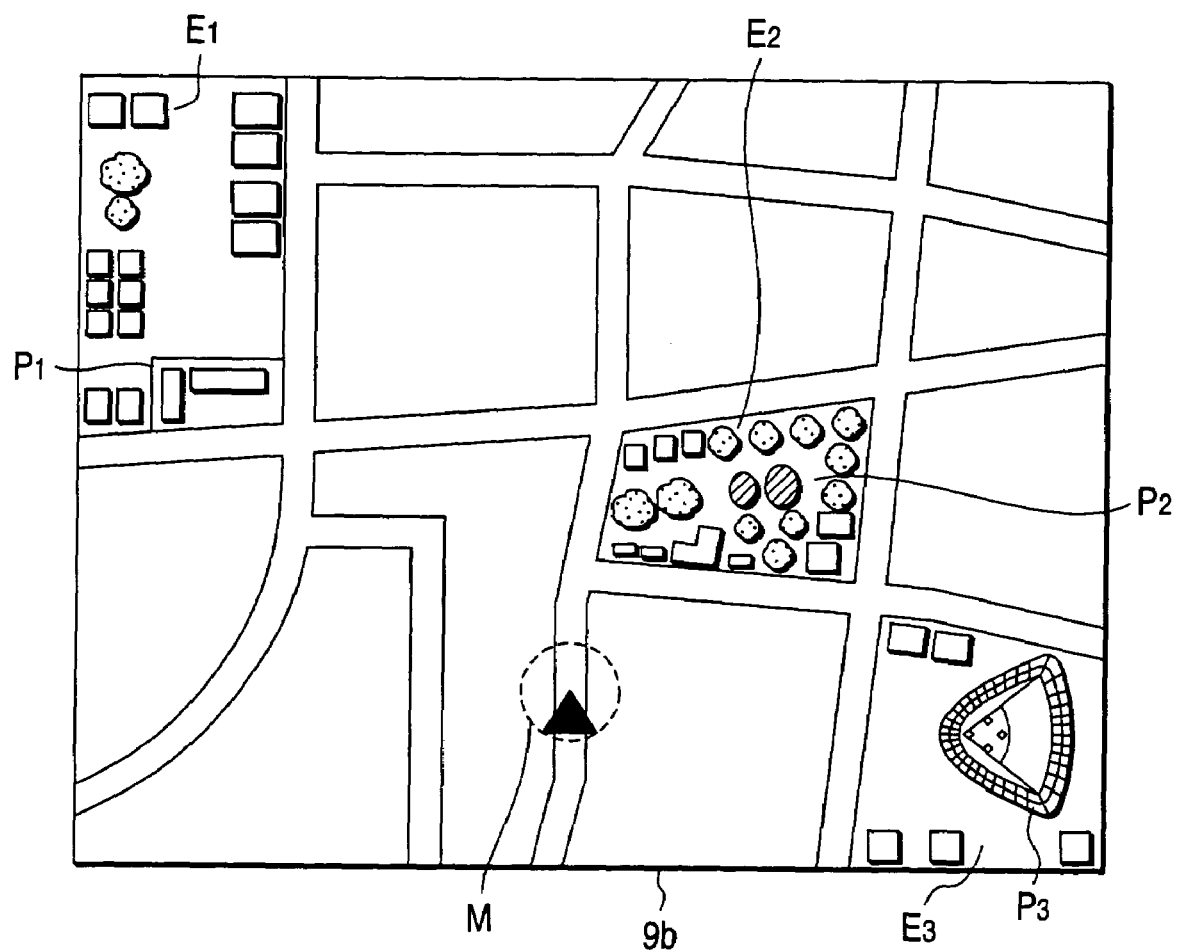
FIG. 8 is a view showing an example of the state of a screen displayed on a display panel in the navigation system in which the image display apparatus according to Embodiment (2) has been adopted.

FIG. 8 is a view showing a state where real images of blocks including facilities such as a school and so on are displayed on the map image displayed on the display panel 9b. In FIG. 8, the reference sign M designates a position mark of the vehicle, and $P_1$ to $P_3$ designate real images of a school, a park and a ballpark, respectively. In addition, in FIG. 8, the reference signs $E_1$ to $E_3$ designate real images of blocks including the school $P_1$, the park $P_2$ and the ballpark $P_3$, respectively.

According to the navigation system in which the image display apparatus according to Embodiment (2) has been adopted, the real images of the blocks (for example, the regions where a school or the like is partitioned by comparatively wide roads such as arterial roads) including facilities (for example, facilities such as schools, parks, and ballparks) taken on the same scale as that of the map image displayed on the display panel 9b are displayed in areas of the map image corresponding to the blocks.

Accordingly, each facility is displayed on the map image not only in the form of a real image but also with the same size (lot area) as the map image. Thus, it is possible to make it very easy to grasp the circumstances shown by the map image. In addition, not only the facility but also the block including the facility are displayed in the form of a real image. Accordingly, not only the facility but also the real circumstances around the facility can be informed to a user.

In addition, when a real image cutting out only the facility is displayed on the map image as shown in FIG. 6, area information (that is, two-dimensional information) showing an area (that is, a plane) corresponding to the facility such as a school is required as the facility data. On the other hand, when a real image of the block including the facility is displayed, it will go well if location information indicating the location (that is, a point) of the facility such as a school is provided. Accordingly, in the image display apparatus according to Embodiment (2), there is an advantage that it will go well if not high-level area information but comparatively low-level location information is prepared.

Next, description will be made on a navigation system in which image display apparatus according to Embodiment (3) has been adopted. Incidentally, the navigation system has a configuration similar to that of the navigation system shown in FIG. 1, except the microcomputer 1. Therefore, the microcomputer is denoted by another reference numeral, and description of the other parts will be omitted here.

Next, a processing operation (3), which the microcomputer 1B performs in the navigation system in which the image display apparatus according to Embodiment (3) has been adopted, will be described with reference to the flow chart shown in FIG. 9A. First, the current position of the vehicle is calculated from the GPS signal or the like (Step S21). A map image showing the periphery of the current position of the vehicle is displayed on the display panel 9b on the basis of the calculated current position information of the vehicle, and the map data (particularly the road data) (Step S22).

Succeedingly, it is judged whether there is a facility registered in the facility data on the map image displayed on the display panel 9b or not (Step S23). When it is concluded that there is a corresponding facility, that is, there is a facility (for example, a school $P_1$, a park $P_2$ or a ballpark $P_3$ shown in FIG. 10 which will be described later) to be displayed on the map image, real image data corresponding to a real image of the facility or real image data corresponding to a real image of a block including the facility is read from the RAM 1a on the basis of area information indicating an area corresponding to the facility or area information indicating an area corresponding to the block including the facility (Step S24). The real image corresponding to the read real image data is displayed in the area where the real image should be displayed (that is, the area indicated by the area information) on the map image (Step S25). On the other hand, when it is concluded in Step S23 that there is no corresponding facility, the processing operation (3) is terminated as it is.

Here, the processing operation in Step 24 will be described in more detail with reference to the flow chart shown in FIG. 9B. Incidentally, the processing operation is an operation to be performed on each facility to be displayed on the map image.

First, it is judged whether the facility is a facility to be displayed in the form of a block display or not (Step 24a). Incidentally, it is judged whether or not the facility is displayed in the form of the block display, on the basis of the category of the facility, the size of the facility, or the like. For example, a real image showing only the facility is displayed when the facility is a school or a ballpark having a comparatively distinct boundary. On the other hand, a real image showing a block including the facility is displayed when the facility is a park having a comparatively indistinct boundary.

Figure 10:
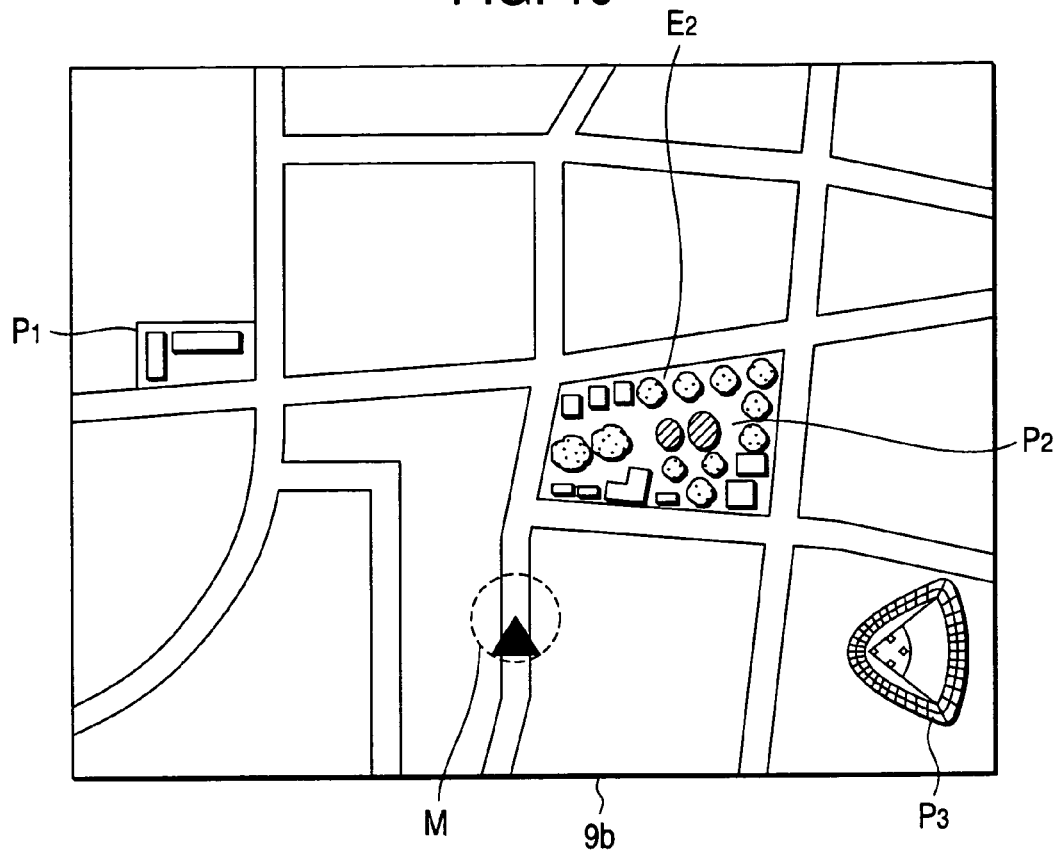
FIG. 10 is a view showing an example of the state of a screen displayed on a display panel in the navigation system in which the image display apparatus according to Embodiment (3) has been adopted.

When it is concluded in Step S24a that it is not a facility to be displayed in the form of the block display, real image data corresponding to a real image of the facility is read from the RAM 1a on the basis of the area information indicating the area corresponding to the facility (for example, the school $P_1$ or the ballpark $P_3$ shown in FIG. 10) (Step S24b).

On the other hand, when it is concluded that it is a facility to be displayed in the form of the block display, a block (for example, block $E_2$ shown in FIG. 10, which is a region partitioned by comparatively wide roads such as arterial roads) including the facility (for example, the park $P_2$ shown in FIG. 10) is obtained on the basis of the location coordinates indicating the location of the facility, and the road data (Step S24c). Next, real image data corresponding to a real image of the block including the facility is read from the RAM 1a on the basis of the area information (for example, the coordinates of nodes and the coordinates of interpolated points indicating the region) of the block (Step S24d).

FIG. 10 is a view showing a state where real images of facilities such as a school and so on and real images of blocks including a park and the like are displayed on the map image displayed on the display panel 9b. In FIG. 10, the reference sign M designates a position mark of the vehicle, and $P_1$ to $P_3$ designate real images of a school, a park and a ballpark, respectively. In FIG. 10, the reference sign $E_2$ designates a real image of the block including the park $P_2$.

In the navigation system in which the image display apparatus according to Embodiment (3) has been adopted, there are provided a function in which the real image of the facility taken on the same scale as that of the map image displayed on the display panel 9b is displayed in an area of the map image corresponding to the facility, and a function in which the real image of the block including the facility and taken on the same scale as that of the map image is displayed in an area corresponding to the block on the map image. Further, these functions are used appropriately in accordance with predetermined conditions. Accordingly, the display of the real image is used appropriately in accordance with the predetermined conditions so that a more significant display form can be attained.

Figure 11:
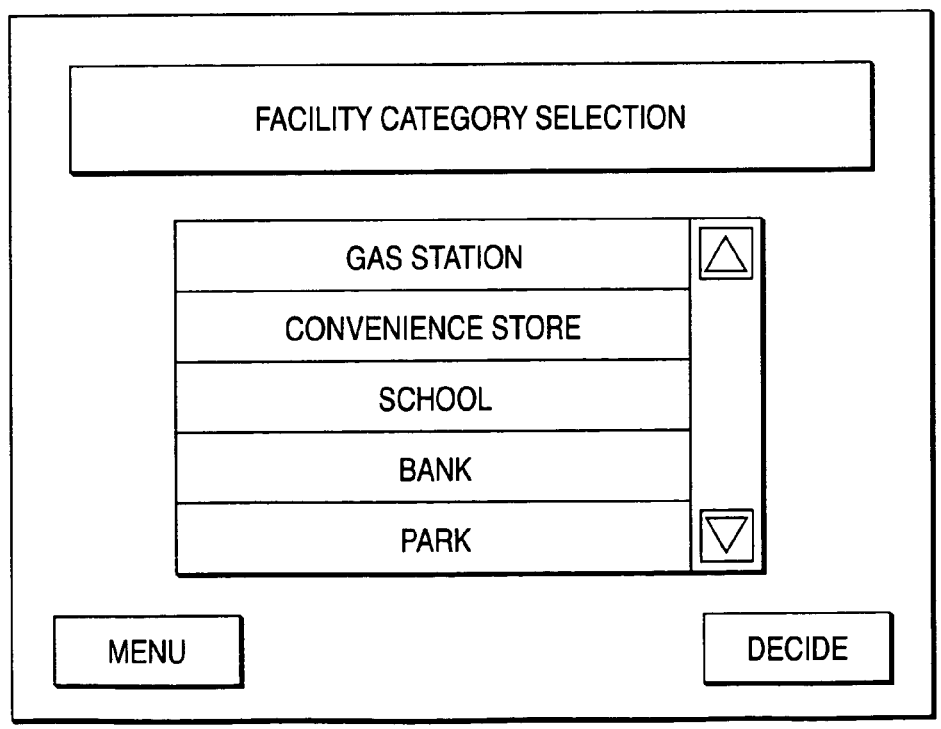
FIG. 11 is a view showing an example of the state of an operation screen displayed on a display panel in a navigation system in which image display apparatus according to another embodiment has been adopted.

Incidentally, in the navigation system in which the image display apparatus according to each of Embodiments (1) to (3) has been adopted, all the facilities registered in the facility data are displayed in the form of real images. However, in a navigation system in which image display apparatus according to another embodiment has been adopted, the user can perform various settings through a screen displayed on the display panel 9b. For example, the category of facilities to be displayed in the form of real images such as satellite photographs can be selected through a "facility category selection" screen as shown in FIG. 11. Thus, the microcomputer 1, 1A or 1B may perform display control of real images in accordance with an instruction set through the "facility category selection" screen by the user.

In a navigation system in which image display apparatus according to a further embodiment has been adopted, the user does not input the category of the facility, but may input facility data concerning the facility such as names of facilities, locations (address) of facilities, or telephone number of facilities. A list of facilities, positions of which have been registered, may be displayed to allow user to select from the list the facility to be displayed in the form of the real image. A list of facilities, which can be displayed in the form of the real image, may be displayed to allow the user to select from the list the facility to be displayed in the form of the real image. Alternatively, facilities having been visited before may be obtained and set as facilities to be displayed as the real images, on the basis of running history data of the past stored in a nonvolatile memory (not shown).

Next, description will be made on a navigation system in which image display apparatus according to Embodiment (4) has been adopted. Incidentally, the navigation system has a configuration similar to that of the navigation system shown in FIG. 1, except the microcomputer 1. Therefore, the microcomputer is denoted by another reference numeral, and description of the other parts will be omitted here.

Figure 12:
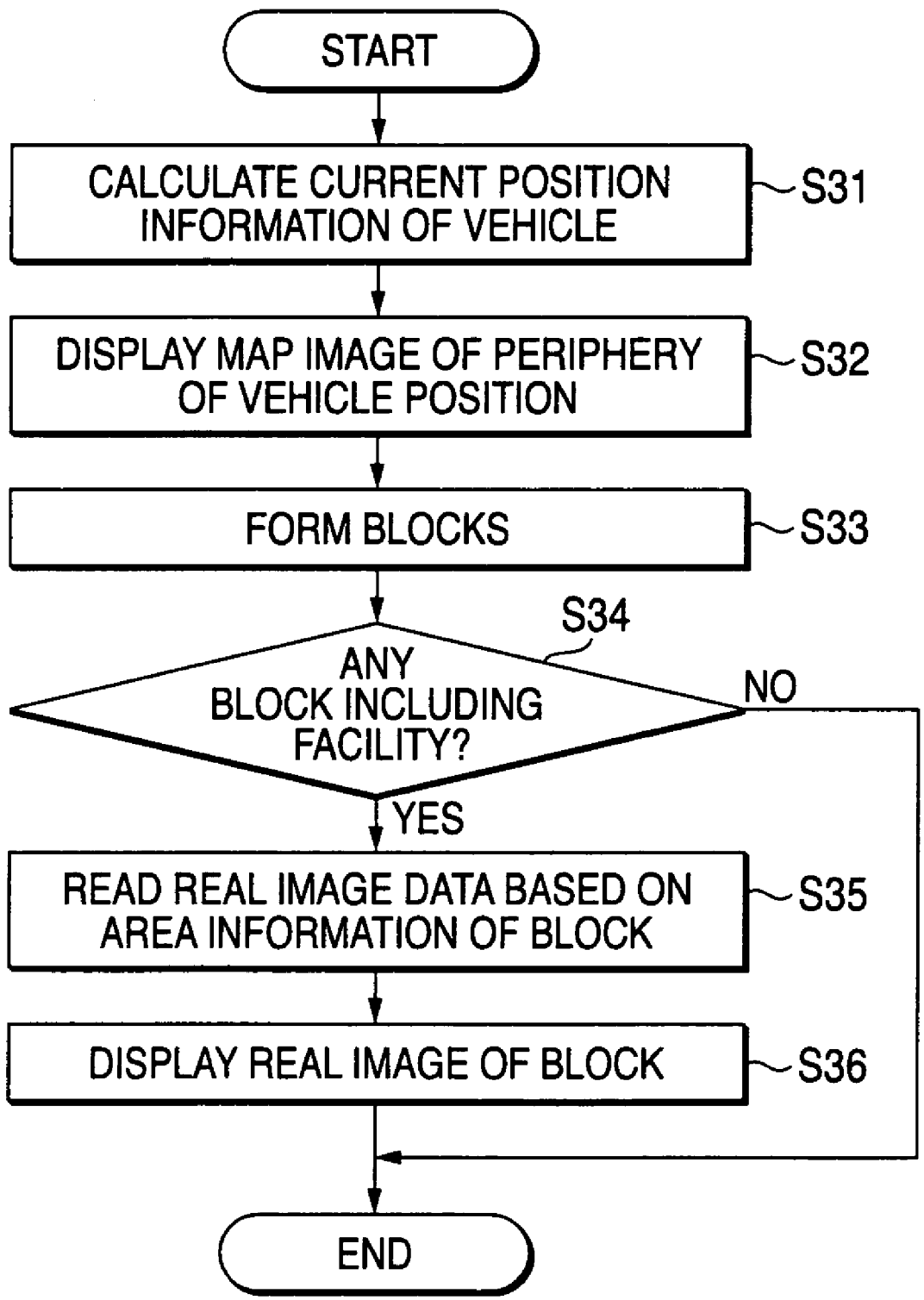
FIG. 12 is a flow chart showing a processing operation to be executed by a microcomputer in a navigation system in which image display apparatus according to Embodiment (4) has been adopted.

A processing operation (4), which the microcomputer IC performs in the navigation system in which the image display apparatus according to Embodiment (4) has been adopted, will be described with reference to the flow chart shown in FIG. 12. First, the current position of the vehicle is calculated from the GPS signal or the like (Step S31). A map image showing the periphery of the current position of the vehicle is displayed on the display panel 9b on the basis of the calculated current position information of the vehicle, and the map data (particularly the road data) (Step S32).

Figure 13:
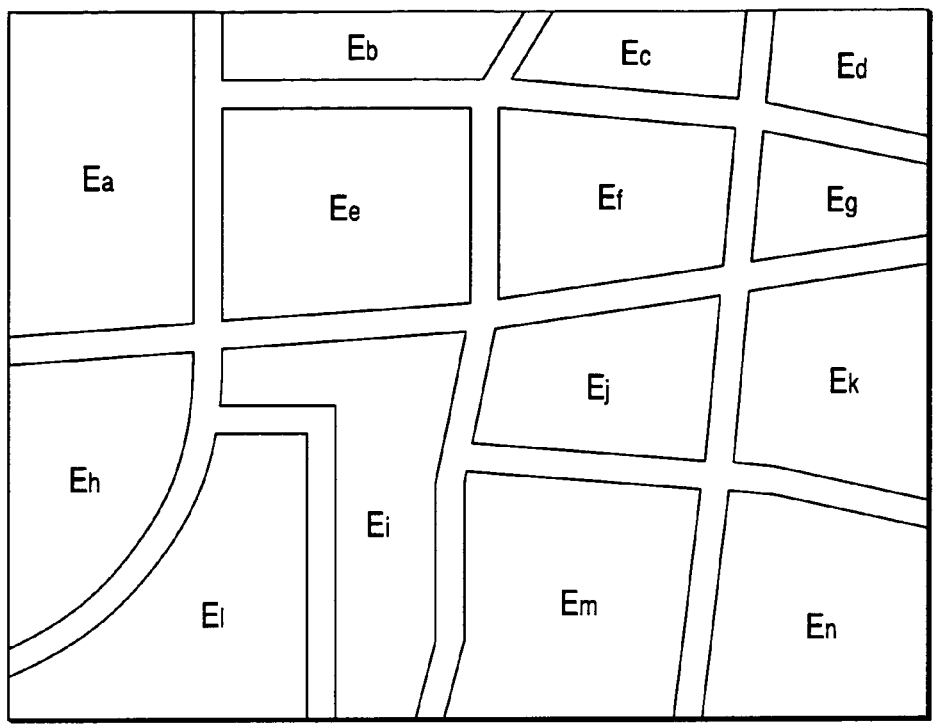
FIG. 13 is an explanatory view for explaining the state where a map image is divided into several areas.

Succeedingly, the map image displayed on the display panel 9b is divided into several areas in accordance with predetermined conditions so as to form blocks (Step S33). Incidentally, a method for forming the blocks includes, for example, a method of forming several blocks along comparatively wide roads such as arterial roads based on the road data. The areas corresponding to the formed blocks can be expressed by coordinates of nodes and coordinates of interpolated points. FIG. 13 is an explanatory view for explaining a state where the map image displayed on the display panel 9b has been divided into several areas. In FIG. 13, the reference signs $E_a$ to $E_n$ designate areas corresponding to the blocks, respectively.

Next, it is judged whether there is a block including a facility (for example, a school, a park, or a ballpark) registered in the facility data or not (Step S34). When it is concluded that there is a corresponding block (for example each of blocks $E_a$, $E_j$ and $E_n$ shown in FIG. 14 which will be described later), real image data corresponding to a real image of the block including the facility is read from the RAM 1a on the basis of the area information of the block (Step S35). The real image corresponding to the read real image data is displayed in the area where the real image should be displayed (that is, the area indicated by the area information) on the map image (Step S36). On the other hand, when it is concluded in Step S34 that there is no corresponding block, the processing operation (4) is terminated as it is.

Figure 14:
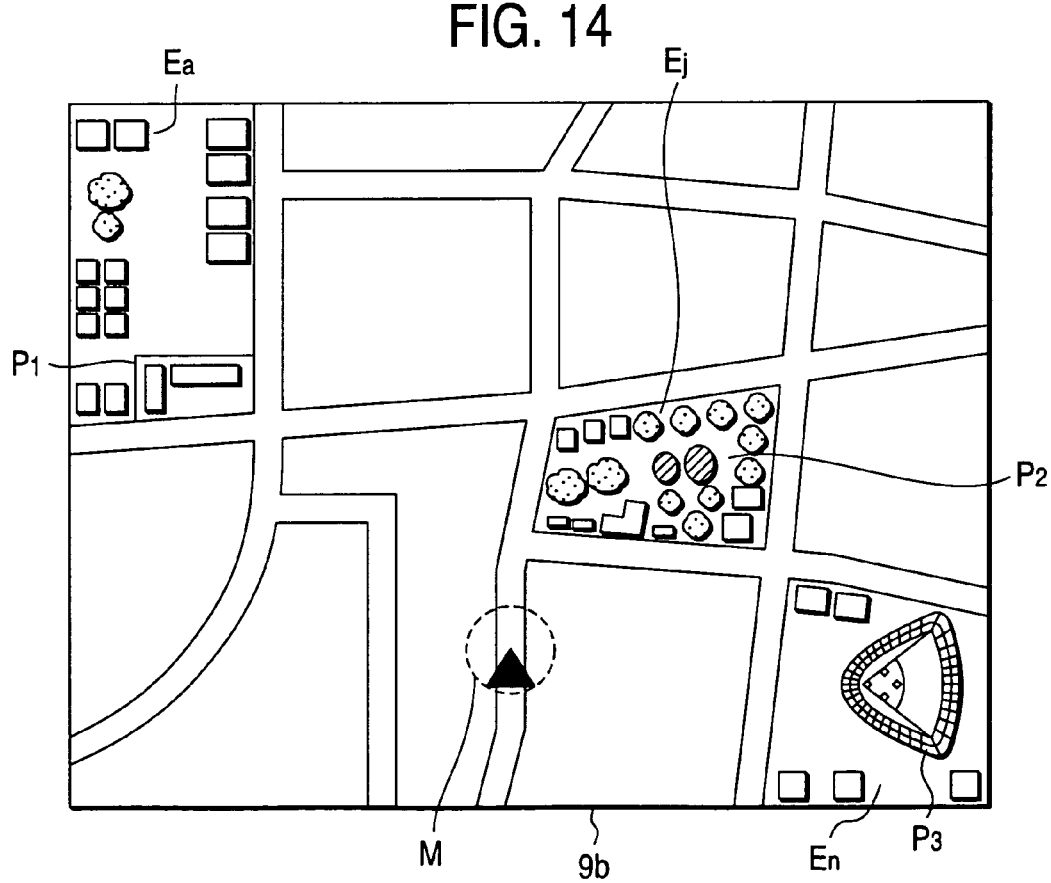
FIG. 14 is a view showing an example of the state of a screen displayed on a display panel in the navigation system in which the image display apparatus according to Embodiment (4) has been adopted.

FIG. 14 is a view showing a state where real images of blocks including facilities such as a school and the like are displayed on the map image displayed on the display panel 9b. In FIG. 14, the reference sign M designates a position mark of the vehicle, and the reference signs $P_1$ to $P_3$ designate real images of a school, a park and a ballpark respectively. In FIG. 14, the reference signs $E_a$, $E_j$ and $E_n$ designate real images of the blocks including the school $P_1$, the park $P_2$ and the ballpark $P_3$ respectively.

In the navigation system in which the image display apparatus according to Embodiment (4) has been adopted, of the blocks formed on the map image displayed on the display panel 9b, the real image of each block including a facility to be displayed, which image has been taken on the same scale as that of the map image, is displayed in an area corresponding to the block on the map image (for example, a region in which a school or the like is partitioned by comparatively wide roads such as arterial roads).

That is, the real image is displayed as if it is fitted into the area corresponding to the block including the facility to be displayed. Thus, it is possible to make it very easy to grasp the circumstances shown by the map image.

Incidentally, in the navigation system in which the image display apparatus according to Embodiment (4) has been adopted, all the blocks including facilities registered in the facility data are displayed in the form of real images. However, in a navigation system in which image display apparatus according to another embodiment has been adopted, the user can perform various settings through a screen displayed on the display panel 9b. For example, the category of facilities to be displayed in the form of real images such as satellite photographs can be selected through the "facility category selection" screen (see FIG. 11). Thus, the microcomputer 1C may perform display control of real images in accordance with an instruction set through the "facility category selection" screen by the user.

In a navigation system in which image display apparatus according to a further embodiment has been adopted, the user can set the real image display not based on the category of facilities but based on specific facilities data or specific sections. Alternatively, facilities or sections having been visited before may be obtained on the basis of running history data of the past stored in a nonvolatile memory (not shown), and blocks including the facilities or sections having been visited before are displayed as the real images.

Next, description will be made on a navigation system in which image display apparatus according to Embodiment (5) has been adopted. Incidentally, the navigation system has a configuration similar to that of the navigation system shown in FIG. 1, except the microcomputer 1. Therefore, the microcomputer is denoted by another reference numeral, and description of the other parts will be omitted here.

Figure 15:
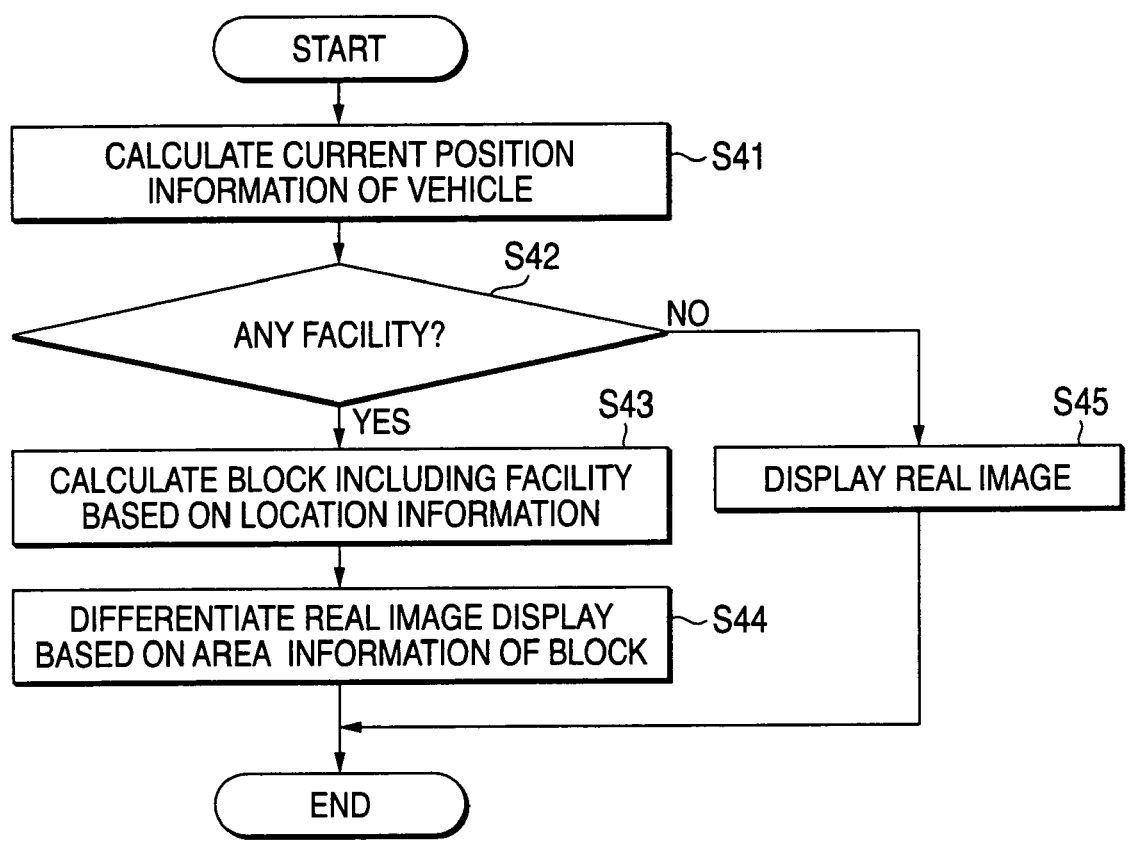
FIG. 15 is a flow chart showing a processing operation to be executed by a microcomputer in a navigation system in which image display apparatus according to Embodiment (5) has been adopted.

A processing operation (5), which the microcomputer 1D performs in the navigation system in which the image display apparatus according to Embodiment (5) has been adopted, will be described with reference to the flow chart shown in FIG. 15. First, the current position of the vehicle is calculated from the GPS signal or the like (Step S41). Next, it is judged whether there is a facility registered in the facility data in an area around the vehicle position to be displayed on the display panel 9b or not (Step S42).

When it is concluded in Step 42 that there is a corresponding facility (for example, a school $P_1$, a park $P_2$ or a ballpark $P_3$ shown in FIG. 16 which will be described later), a block (for example, each of blocks $E_1$ to $E_3$ shown in FIG. 16, which is a region partitioned by comparatively wide roads such as arterial roads) including the corresponding facility is obtained on the basis of the location coordinates indicating the location of the facility, and the road data (Step S43). Incidentally, a method for obtaining the block includes a method of picking up the coordinates of nodes and the coordinates of interpolated points indicating the region.

Next, a real image showing the periphery of the current position of the vehicle is displayed on the display panel 9b on the basis of the current position information of the vehicle calculated in Step S41, and the real image data stored in the RAM 1a (Step S44). Incidentally, at this time, the block (for example, each of blocks $E_1$ to $E_3$) including the facility is differentiated from any other portion on the basis of the area information of the block (for example, the coordinates of nodes and the coordinates of interpolated points indicating the region) in such a manner that the former is displayed in color while the latter is displayed in monochrome.

On the other hand, it is concluded in Step S42 that there is no corresponding facility, it is not necessary to differentiate the display. Thus, the real image showing the periphery of the current position of the vehicle is displayed in monochrome on the display panel 9b on the basis of the current position information of the vehicle calculated in Step S41, and the real image data stored in the RAM 1a (Step S45).

Figure 16:
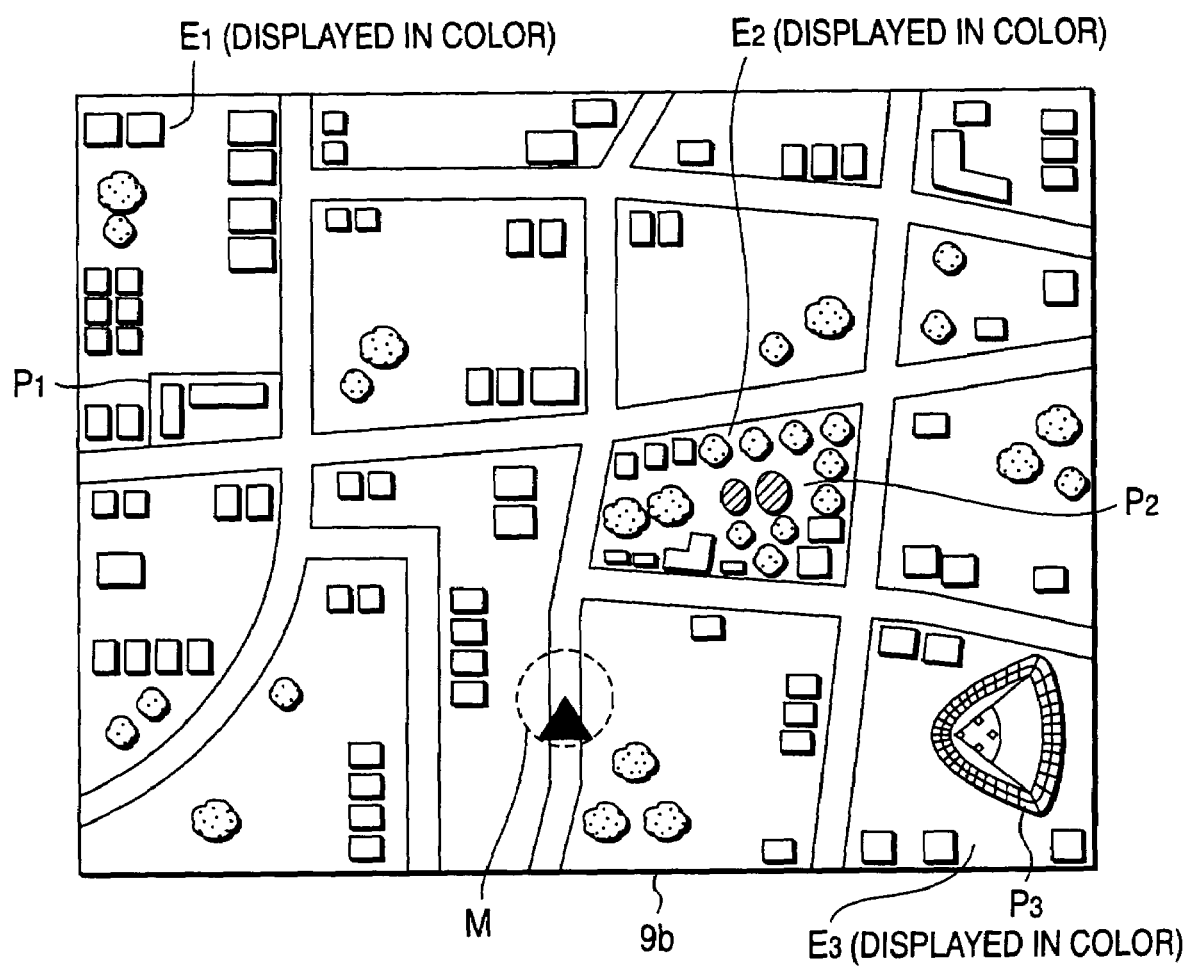
FIG. 16 is a view showing an example of the state of a screen displayed on a display panel in the navigation system in which the image display apparatus according to Embodiment (5) has been adopted.

FIG. 16 is a view showing a state where real images are displayed on the display panel 9b. In FIG. 16, the reference sign M designates a position mark of the vehicle, and the reference signs $P_1$ to $P_3$ designate real images of a school, a park and a ballpark respectively. In FIG. 16, the reference signs $E_1$ to $E_3$ designate real images of blocks including the school $P_1$, the park $P_2$ and the ballpark $P_3$ respectively.

In the navigation system in which the image display apparatus according to Embodiment (5) has been adopted, the real images are displayed on the display panel 9b so that each block (displayed in color) including a facility registered in the registered data is differentiated from any other portion (displayed in monochrome). It should be noted that the differentiation method is not limited to the method of displaying the block including the facility registered in the registered data in color and displaying the other portions in monochrome. Any method can be employed so long as the method displays the block including the facility registered in the registered data and the other portions with differentiating them from each other. Specific examples of the differentiation method include: a method of displaying the block including the facility registered in the registered data in monochrome and the other portions in color, a method of displaying both of the block including the facility registered in the registered data and the other portions in color and increasing brightness of the block including the facility registered in the registered data, a method of displaying the block including the facility registered in the registered data with a line surrounding the block.

Thus, the user can grasp a more remarkable block or the like instantaneously. It is therefore possible to attain very signification apparatus.

Incidentally, in the navigation system in which the image display apparatus according to Embodiment (5) has been adopted, the blocks including facilities registered in the facility data are differentiated from any other block. However, in a navigation system in which image display apparatus according to another embodiment has been adopted, the user can perform various settings through a screen displayed on the display panel 9b. For example, the category of facilities can be selected through the "facility category selection" screen (see FIG. 11). Thus, the blocks including facilities set through the "facility category selection" screen may be differentiated from any other block by the microcomputer 1D.

In a navigation system in which image display apparatus according to a further embodiment has been adopted, the user can set the real image display not based on the category of facilities but based on some specific facilities data. Alternatively, facilities or sections having been visited before may be obtained on the basis of running history data of the past stored in a nonvolatile memory (not shown), so that the blocks including facilities or sections having been visited before can be differentiated from any other block. Thus, the user can instantaneously grasp which site the user has visited before through the contents displayed on the display panel 9b.

Description in each image display apparatus according to Embodiments (1)–(5) has been made only the cases where real images of predetermined facilities (such as schools, parks and ballparks) or real images of blocks including such predetermined facilities are displayed. However, image display apparatus according to the invention is not limited to the cases of such predetermined facilities. The image display apparatus may display real images of predetermined sites or real images of blocks including such predetermined sites. For example, the image display apparatus may display real images of fields of rice and other crops, holding reservoirs, and the like, or real images of blocks including fields of rice and other crops, holding reservoirs, and the like.

What is claimed is:

1. An image display apparatus comprising:
    a first display control unit that displays a map image on a display screen on the basis of map data; and
    a second display control unit that displays a real image showing a predetermined place on the basis of position coordinates corresponding to the area of the predetermined place on the map image and real image data, wherein the real image has the same scale as that of the map image.

2. The image display apparatus according to claim 1, further comprising:
    a block calculating unit that obtains a block including the predetermined place on the basis of position coordinates encompassing the location of the predetermined place;
    a third display control unit that displays another real image showing the block calculated by the block calculating unit on the basis of position coordinates encompassing the location of the predetermined place on the map image and real image data, wherein the another real image has the same scale as that of the map image; and
    a changeover control unit that changes control between the second display control unit and the third display control unit on the basis of a predetermined condition.

3. The image display apparatus according to claim 1, further comprising:
    a place setting unit that allows a user to set a specific place,
    wherein the predetermined place is the specific place set by the place setting unit.

4. The image display apparatus according to claim 1, further composing:
    a category setting unit that allows a user to set a specific category;
    wherein the predetermined place is included in the specific category set by the category setting unit.

5. An image display apparatus comprising:
    a first display control unit that displays a map image on a display screen on the basis of map data; and
    a block calculating unit that obtains a block including a predetermined place on the basis of position coordinates encompassing the location of the predetermined place; and
    a third display control unit that displays a real image showing the block calculated by the block calculating unit on the basis of position coordinates encompassing the location of the predetermined place on the map image and real image data, wherein the real image has the same scale as that of the map image.

6. A navigation apparatus that provides a user with information required for reaching a destination and guiding a vehicle to the destination, the navigation apparatus comprising:
    a display screen;
    a first display control unit that displays a map image on the display screen on the basis of map data; and
    a second display control unit that displays a real image showing a predetermined place on the basis of an area position coordinates corresponding to the area of the predetermined place on the map image and real image data, wherein the real image has the same scale as that of the map image;
    a storage unit that stores information about a running history of the vehicle; and
    a place calculating unit that obtains a specific place on the basis of the running history stored in the storage unit,
    wherein the predetermined place is the specific place obtained by the place calculating unit.

7. An image display apparatus comprising:
    a first display control unit that displays a map image on a display screen on the basis of map data; and
    a fourth display control unit that displays a real image showing a predetermined block on the basis of position coordinates corresponding to the area of the predetermined block on the map image and real image data, wherein the real image has the same scale as that of the map image.

8. A navigation apparatus that provides a user with information required for reaching a destination and guiding a vehicle to the destination, the navigation apparatus comprising:
    a display screen;
    a first display control unit that displays a map image on the display screen on the basis of map data;
    a fourth display control unit for displaying a real image showing a predetermined block on the basis position coordinates corresponding to the area of the predetermined block on the map image and real image data, wherein the real image has the same scale as that of the map image;
    a storage unit that stores information about a running history of the vehicle; and
    a block calculating unit that obtains a specific block on the basis of the running history stored in the storage unit,
    wherein the predetermined block is the specific block obtained by the block calculating unit.

* * * * *